US008562694B2

(12) United States Patent  (10) Patent No.: US 8,562,694 B2
Tzikas et al.  (45) Date of Patent: Oct. 22, 2013

(54) FIBRE-REACTIVE AZO DYES, THEIR PREPARATION AND THEIR USE

(75) Inventors: Athanassios Tzikas, Dornach (CH); Herbert Klier, Efringen-Kirchen (DE); Georg Roentgen, Freiburg (DE)

(73) Assignee: Huntsman International LLC, The Woodlands, TX (US)

( * ) Notice: Subject to any disclaimer, the term of this patent is extended or adjusted under 35 U.S.C. 154(b) by 0 days.

(21) Appl. No.: 13/384,350

(22) PCT Filed: Jun. 30, 2010

(86) PCT No.: PCT/EP2010/059292
§ 371 (c)(1),
(2), (4) Date: Jan. 17, 2012

(87) PCT Pub. No.: WO2011/018274
PCT Pub. Date: Feb. 17, 2011

(65) Prior Publication Data
US 2012/0117737 A1 May 17, 2012

(30) Foreign Application Priority Data

Aug. 14, 2009 (EP) .................................. 09167920

(51) Int. Cl.
*C09B 62/006* (2006.01)
(52) U.S. Cl.
USPC ......... 8/543; 8/636; 8/688; 534/797; 534/588
(58) Field of Classification Search
USPC .................................................. 8/636, 688
See application file for complete search history.

(56) References Cited

U.S. PATENT DOCUMENTS

| 5,395,925 | A | * | 3/1995 | Koch et al. | 534/634 |
| 5,684,138 | A | * | 11/1997 | Klier et al. | 534/612 |
| 2006/0185100 | A1 | * | 8/2006 | Tzikas | 8/543 |

FOREIGN PATENT DOCUMENTS

| EP | 0 625 549 | 11/1994 |
| EP | 0 763 570 | 3/1997 |
| WO | 2004/085545 | 10/2004 |

OTHER PUBLICATIONS

Dalai et al., "Dyeing Effects of Bifunctional Reactive Dyes on Knitted Cotton Fabrics", American Dyestuff Reporter, Apr. 1996, pp. 22-25.*
International Search Report and Written Opinion regarding corresponding application No. PCT/EP2010/059292, dated Dec. 6, 2010.

* cited by examiner

*Primary Examiner* — Harold Pyon
*Assistant Examiner* — Katie L Hammer

(57) ABSTRACT

Reactive dyes of the formula (1) wherein B is an aliphatic bridging member, G is a sulfo naphthalene group or a sulfo benzene group of the formula (2a) or a pyridone radical of the formula (2b), $R_1$, $R_2$, $R_3$ and $R_4$ are each independently of the others hydrogen or unsubstituted or substituted $C_1$-$C_4$alkyl, $(R_5)_h$ denotes h identical or different substituents selected from the group sulfo, $C_1$-$C_4$alkyl and $C_1$-$C_4$alkoxy, $R_6$ is hydrogen, sulfo, halogen, carboxy, $C_1$-$C_4$alkyl, $C_1$-$C_4$alkoxy or a fiber-reactive group $Z_1$ of the formula —$SO_2$—Y (3a), —NH—CO—$(CH_2)_l$—$SO_2$—Y (3b), —CONH—$(CH_2)_m$—$SO_2$—Y (3c), —NH—CO—CH(Hal)-$CH_2$-Hal (3d) or —NH—CO—C(Hal)=$CH_2$ (3e), $R_7$ is amino, $C_1$-$C_4$alkyl or a fiber-reactive group $Z_2$ of the formula —NH—$(CH_2)_n$—$SO_2$—Y (3a), $(R_8)_j$ denotes j identical or different substituents selected from the group sulfo, $C_2$-$C_4$alkanoylamino, ureido, $C_1$-$C_4$alkyl and $C_1$-$C_4$alkoxy, $R_9$ is hydrogen, $C_1$-$C_4$alkyl or $C_1$-$C_4$alkoxy, $R_{10}$ is hydrogen or $C_1$-$C_4$alkyl, $R_{11}$ is hydrogen, cyano, carbamoyl or sulfomethyl, and $R_{12}$ is hydrogen, $C_1$-$C_4$alkyl, or phenyl which is unsubstituted or substituted by $C_1$-$C_4$alkyl, $C_1$-$C_4$alkoxy, $C_2$-$C_4$alkanoylamino, ureido, halogen or sulfo, $X_1$ and $X_2$ are halogen, Hal is chlorine or bromine, h and j are each independently of the other a number 0, 1 or 2; k is a number 1, 2 or 3; I, m and n are each independently of the other a number 2, 3 or 4, and Y is vinyl or a radical —$CH_2$—$CH_2$—U and U is a group removable under alkaline conditions, with the proviso that the dye of formula (1) contains at least one fiber-reactive group $Z_1$ or $Z_2$ are suitable for dyeing cellulosic or amide-group-containing fiber materials.

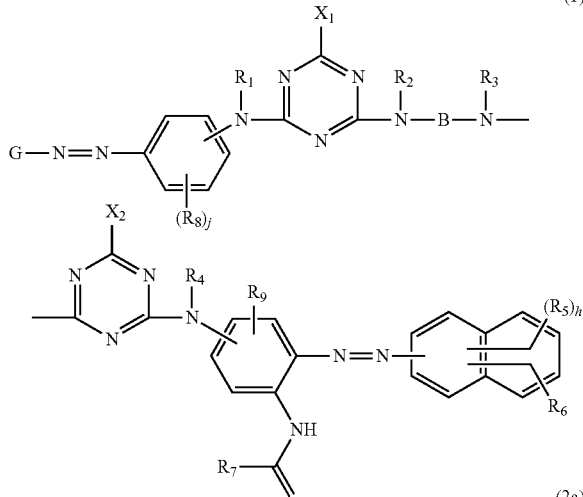

(1)

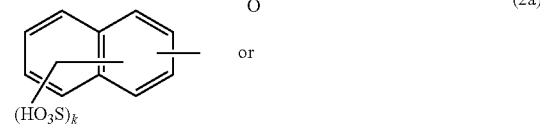

(2a)

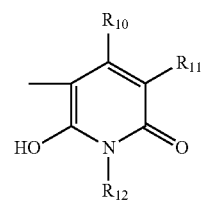

(2b)

8 Claims, No Drawings

FIBRE-REACTIVE AZO DYES, THEIR PREPARATION AND THEIR USE

CROSS REFERENCE TO RELATED APPLICATIONS

This application is the National Phase of International Application PCT/EP2010/059292 filed Jun. 30, 2010 which designated the U.S. and which claims priority to European (EP) Pat. App. No. 09167920.9 filed Aug. 14, 2009. The noted applications are incorporated herein by reference.

The present invention relates to novel reactive dyes, to processes for the preparation thereof and to the use thereof in dyeing or printing textile fibre materials.

The practice of dyeing using reactive dyes has recently led to higher demands being made of the quality of the dyeings and the profitability of the dyeing process. As a result, there is still a need for novel reactive dyes having improved properties, especially in respect of their application.

Dyeing nowadays requires reactive dyes that have sufficient substantivity and at the same time have good ease of washing off of unfixed dye. They should also have a good tinctorial yield and high reactivity, the objective being to provide especially dyeings having high degrees of fixing. The known dyes do not satisfy these requirements in all properties.

The asymmetric dyes known from U.S. Pat. Nos. 5,395,925 and 5,552,532 still have certain disadvantages in respect of the above-mentioned properties.

The problem underlying the present invention is therefore to find, for the dyeing and printing of fibre materials, novel improved reactive dyes that possess the qualities described above to a high degree. The novel dyes should especially be distinguished by high fixing yields and high fibre-dye bond stability. The dyes should also yield dyeings having good all-round fastness properties, for example light-fastness and wet-fastness properties.

It has been shown that the problem posed is largely solved by the novel dyes defined below.

The present invention accordingly relates to a reactive dye of the formula

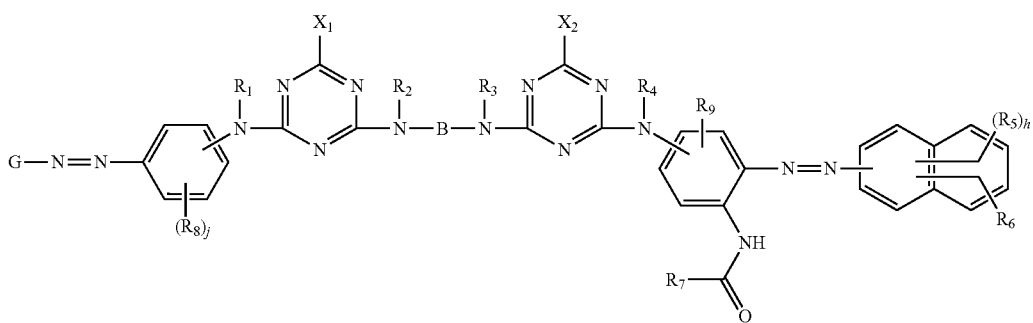

(1)

wherein
B is an aliphatic bridging member,
G is a sulfo naphthalene group or a sulfo benzene group of the formua

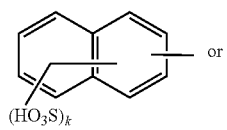

(2a)

or a pyridone radical of the formula

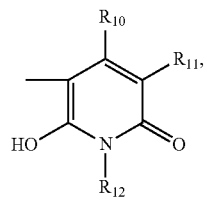

(2b)

$R_1$, $R_2$, $R_3$ and $R_4$ are each independently of the others hydrogen or unsubstituted or substituted $C_1$-$C_4$ alkyl, $(R_5)_h$ denotes h identical or different substituents selected from the group sulfo, $C_1$-$C_4$ alkyl and $C_1$-$C_4$ alkoxy, $R_6$ is hydrogen, sulfo, halogen, carboxy, $C_1$-$C_4$ alkyl, $C_1$-$C_4$ alkoxy or a fibre-reactive group $Z_1$ of the formula $$-SO_2-Y \qquad (3a),$$

$$-NH-CO-(CH_2)_l-SO_2-Y \qquad (3b),$$

$$-CONH-(CH_2)_m-SO_2-Y \qquad (3c),$$

$$-NH-CO-CH(Hal)-CH_2-Hal \qquad (3d) \text{ or}$$

$$-NH-CO-C(Hal)=CH_2 \qquad (3e),$$

$R_7$ is amino, $C_1$-$C_4$ alkyl or a fibre-reactive group $Z_2$ of the formula $$-NH-(CH_2)_n-SO^2-Y \qquad (3a),$$

$(R_8)_j$ denotes j identical or different substituents selected from the group sulfo, $C_2$-$C_4$ alkanoylamino, ureido, $C_1$-$C_4$ alkyl and $C_1$-$C_4$ alkoxy, $R_9$ is hydrogen, $C_1$-$C_4$ alkyl or $C_1$-$C_4$ alkoxy, $R_{10}$ is hydrogen or $C_1$-$C_4$ alkyl, $R_{11}$ is hydrogen, cyano, carbamoyl or sulfomethyl, and $R_{12}$ is hydrogen, $C_1$-$C_4$ alkyl, or phenyl which is unsubstituted or substituted by $C_1$-$C_4$ alkyl, $C_1$-$C_4$ alkoxy, $C_2$-$C_4$ alkanoylamino, ureido, halogen or sulfo, $X_1$ and $X_2$ are halogen,
Hal is chlorine or bromine,
h and j are each independently of the other a number 0, 1 or 2,
k is, a number 1, 2 or 3,
l, m and n are each independently of the other a number 2, 3 or 4, and
Y is vinyl or a radical —$CH_2$—$CH_2$—U and U is a group removable under alkaline conditions,
with the proviso that the dye of formula (1) contains at least one fibre-reactive group $Z_1$ or $Z_2$.

The dyes of formula (1) contain at least two, preferably from 2 to 5 and especially 4 or 5, sulfo groups, which are each present either in free acid form or, preferably, in salt form. Suitable salts are, for example, alkali metal, alkaline earth metal or ammonium salts, salts of an organic amine, or mixtures thereof. Examples that may be mentioned are sodium, lithium, potassium or ammonium salts, a mono-, di- or triethanolamine salt or mixed Na/Li or Na/Li/$NH_4$ salts.

In another embodiment $R_6$ is a fibre-reactive group $Z_1$ of the formula (3a), (3b), (3c), (3d) or (3e) as defined above, and $R_7$ is amino or $C_1$-$C_4$alkyl, especially amino.

In yet another embodiment of the present invention the reactive dye of formula (1) corresponds to the formula

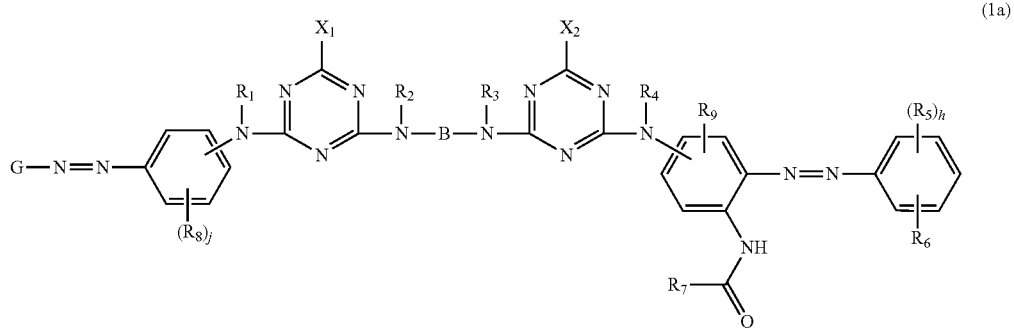

(1a)

wherein
B is an aliphatic bridging member,
G is a sulfo naphthalene group or a sulfo benzene group of the formula (2a), wherein k is as defined above,
$R_1$, $R_2$, $R_3$ and $R_4$ are each independently of the others hydrogen or unsubstituted or substituted $C_1$-$C_4$alkyl,
$(R_5)_h$ denotes h identical or different substituents selected from the group sulfo, $C_1$-$C_4$alkyl and $C_1$-$C_4$alkoxy,
$R_6$ is a fibre-reactive group $Z_1$ of the formula

 —$SO_2$—Y (3a),

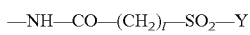 —NH—CO—$(CH_2)_l$—$SO_2$—Y (3b),

—CONH—$(CH_2)_m$—$SO_2$—Y (3c),

 —NH—CO—CH(Hal)-$CH_2$-Hal (3d) or

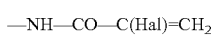 —NH—CO—C(Hal)=$CH_2$ (3e), $R_7$ is amino or $C_1$-$C_4$alkyl,
$(R_8)_j$ denotes j identical or different substituents selected from the group $C_2$-$C_4$alkanoylamino, ureido, $C_1$-$C_4$alkyl and $C_1$-$C_4$alkoxy,
$R_9$ is hydrogen, $C_1$-$C_4$alkyl or $C_1$-$C_4$alkoxy,
$X_1$ and $X_2$ are halogen,
Hal is chlorine or bromine,
h and j are each independently of the other a number 0, 1 or 2,
k is a number 1, 2 or 3,
l and m are each independently of the other a number 2, 3 or 4, and
Y is vinyl or a radical —$CH_2$—$CH_2$—U and U is a group removable under alkaline conditions.

The radicals $R_1$, $R_2$, $R_3$ and $R_4$ in the reactive dye of formula (1) which are alkyl radicals are straight-chained or branched. The alkyl radicals may be further substituted, for example by hydroxy, sulfo, sulfato, cyano or carboxy. As examples the following radicals may be mentioned: methyl, ethyl, n-propyl, isopropyl, n-butyl, sec-butyl, tert-butyl or isobutyl, and also the corresponding radicals substituted by hydroxy, sulfo, sulfato, cyano or carboxy. Preferred substituents are hydroxy, sulfo or sulfato, especially hydroxy or sulfato and more especially hydroxy.

$R_1$ and $R_4$ preferably are each independently of the other hydrogen or $C_1$-$C_4$alkyl, especially hydrogen.

$R_2$ and $R_3$ preferably are each independently of the other hydrogen or $C_1$-$C_4$alkyl which is unsubstituted or substituted by hydroxy, sulfo, sulfato, cyano or carboxy. In an interesting embodiment, one of the radicals $R_2$ and $R_3$ is $C_1$-$C_4$alkyl which is substituted by hydroxy, sulfo, sulfato, cyano or carboxy and the other of the radicals $R_2$ and $R_3$ is hydrogen or $C_1$-$C_4$alkyl, especially hydrogen.

$R_2$ and $R_3$ especially are each independently of the other hydrogen or $C_1$-$C_4$alkyl, more especially hydrogen.

In an important embodiment of the present invention, $R_1$, $R_2$, $R_3$ and $R_4$ are each independently of the others hydrogen or $C_1$-$C_4$alkyl, especially hydrogen.

As $C_1$-$C_4$alkyl for $R_5$, $R_6$, $R_7$, $R_8$, $R_9$, $R_{10}$ and $R_{12}$ there come into consideration each independently of any other(s), for example, methyl, ethyl, n-propyl, isopropyl, n-butyl, sec-butyl, tert-butyl or isobutyl, preferably methyl or ethyl. Especially preferably $R_5$, $R_6$, $R_7$, $R_8$ and $R_9$ and $R_{10}$ are methyl. Especially preferably $R_{12}$ is ethyl.

As $C_1$-$C_4$alkoxy for $R_5$, $R_6$, $R_8$ and $R_9$ there come into consideration each independently of any other(s), for example, methoxy, ethoxy, n-propoxy, isopropoxy, butoxy or isobutoxy, preferably methoxy or ethoxy, and especially methoxy.

As halogen for $R_6$ there comes into consideration, for example, fluorine, chlorine or bromine, preferably chlorine or bromine, and especially chlorine.

$C_2$-$C_4$alkanoylamino $R_8$ is, for example, acetylamino or propionylamino, in particular acetylamino.

h is preferably a number 0 or 1.

j is preferably a number 1 or 2, especially 1.

In a preferred embodiment $(R_5)_h$ denotes hydrogen, wherein h is the number 0, or sulfo, wherein h is the number 1, especially sulfo.

In a preferred embodiment $(R_8)_j$ denotes 1 or 2 identical or different substituents selected from the group $C_2$-$C_4$alkanoylamino, ureido, $C_1$-$C_4$alkyl and $C_1$-$C_4$alkoxy.

In another preferred embodiment $(R_8)_j$ denotes $C_2$-$C_4$alkanoylamino or ureido, wherein j is the number 1, especially ureido.

Preferably $R_9$ is hydrogen or $C_1$-$C_4$alkoxy, especially hydrogen.

Examples of suitable radicals Y are accordingly vinyl, β-bromo- or β-chloro-ethyl, β-acetoxy-ethyl, β-benzoyloxy-ethyl, β-phosphatoethyl, β-sulfatoethyl and β-thiosulfatoethyl. Y is preferably vinyl, β-chloroethyl or β-sulfatoethyl and especially vinyl or β-sulfatoethyl.

Preferred reactive dyes of formula (1) are the reactive dyes of the formula

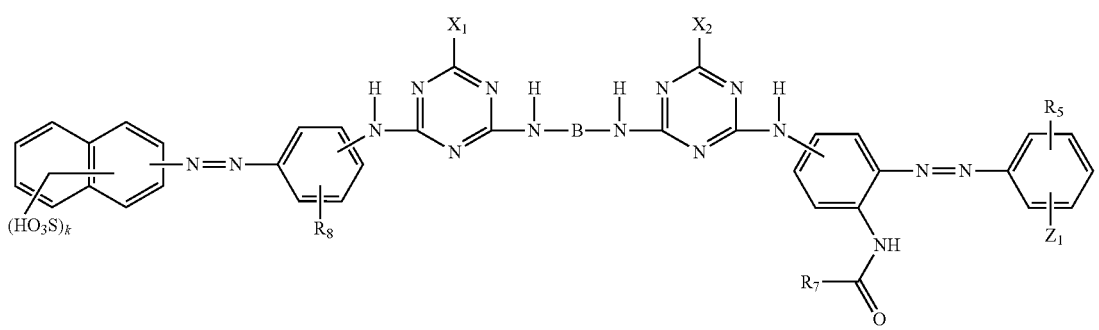

(1b)

B is, for example, straight-chain or branched $C_2$-$C_{12}$alkylene which is unsubstituted or substituted by hydroxy, $C_1$-$C_4$alkoxy, sulfato or sulfo and which may be interrupted once or more than once by —O— or —NR*—, preferably —O—, R* being hydrogen or $C_1$-$C_4$alkyl, preferably hydrogen, methyl or ethyl and especially hydrogen. B preferably is straight-chain or branched $C_2$-$C_6$alkylene which is unsubstituted or substituted by hydroxy, sulfo or sulfato, especially hydroxy, and more especially is straight-chain or branched $C_2$-$C_6$alkylene. Examples of preferred radicals B are 1,2-ethylene, 1,2-propylene, 1,3-propylene, 2-hydroxy-1,3-propylene, 1,4-butylene, 2,2-dimethyl-1,3-propylene, 2-methyl-1,5-pentylene, 1,6-hexylene.

Of special interest as bridging members B are those $C_2$-$C_6$alkylene radicals which correspond to the formula —$CH_2$—$CH(R_{13})$— or —$(R_{13})CH$—$CH_2$— wherein $R_{13}$ is $C_1$-$C_4$alkyl, especially methyl. Of very special importance for B is the meaning 1,2-propylene.

$X_1$ and $X_2$ preferably are each independently of the other chlorine or fluorine. The radicals $X_1$ and $X_2$ are identical or not identical. In a particular embodiment of the present invention one of the radicals $X_1$ and $X_2$ is fluorine and the other of the radicals $X_1$ and $X_2$ is chlorine. Preferably, the radicals $X_1$ and $X_2$ are identical and denote fluorine.

Hal is bromine or chlorine, preferably bromine.

k is preferably a number 2 or 3, especially 3.

l is preferably a number 2 or 3, especially 3.

m and n preferably are each independently of the other a number 2 or 3, especially 2.

$Z_1$ is preferably a radical of formula (3a), (3b) or (3c), especially formula (3a) or (3b) and more especially (3a), wherein l, m and Y have the definitions and preferred meanings given above.

As a group U removable under alkaline conditions there come into consideration, for example, —Cl, —Br, —F, —$OSO_3H$, —$SSO_3H$, —OCO—$CH_3$, —$OPO_3H_2$, —OCO—$C_6H_5$, —$OSO_2$—$C_1$-$C_4$alkyl and —$OSO_2$—N$(C_1$-$C_4$alkyl$)_2$. U is preferably a group of formula —Cl, —$OSO_3H$, —$SSO_3H$, —OCO—$CH_3$, —OCO—$C_6H_5$ or —$OPO_3H_2$, especially —Cl or —$OSO_3H$ and more especially —$OSO_3H$.

wherein

B, $R_5$, $R_7$, $R_8$, $X_1$, $X_2$, $Z_1$ and k each independently having the respective definitions and preferred meanings as defined above.

Special preference is given to reactive dyes of formula (1b), wherein

B is a radical of the formula —$CH_2$—$CH(R_{13})$— or —$(R_{13})$CH—$CH_2$— wherein $R_{13}$ is $C_1$-$C_4$alkyl, $R_5$ is hydrogen or sulfo, $Z_1$ is a fibre-reactive group of the formula —$SO_2$—Y (3a) or —NH—CO—$(CH_2)_l$—$SO_2$—Y (3b), $R_7$ is amino, $R_8$ is $C_2$-$C_4$alkanoylamino or ureido, $X_1$ and $X_2$ are each independently of the other fluorine or chlorine, k is a number 2 or 3, l is a number 2 or 3, and Y is vinyl or β-sulfatoethyl.

The present invention relates also to a process for the preparation of dyes of formula (1), wherein each of the compounds of formulae

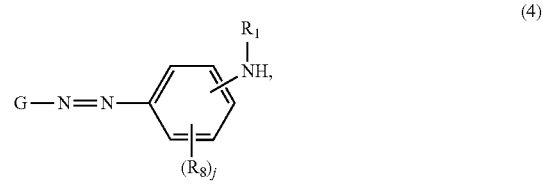

(4)

-continued

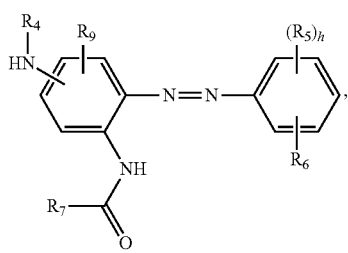
(5)

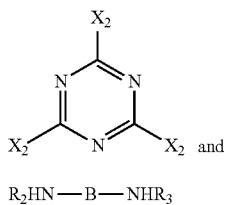
(6)

(7)

$R_2HN-B-NHR_3$ (8)

are reacted with one another in a suitable order and in suitable molar equivalents, wherein B, G, $R_1$, $R_2$, $R_3$, $R_4$, $R_5$, $R_6$, $R_7$, $R_8$, $R_9$, $X_1$, $X_2$, h and j each independently having the respective definitions and preferred meanings given above.

As cyanuric halide of formulae (6) and (7) there are suitable cyanuric chloride and cyanuric fluoride.

The compounds of formulae (6) and (7) are identical or not identical. In an interesting embodiment one of the compounds of the formulae (6) and (7) is cyanuric chloride and the other one of the compounds of the formulae (6) and (7) is cyanuric fluoride.

The monoazo compounds of the formulae (4) and (5) can be obtained by diazotation and coupling reactions. Diazotisation is carried out in customary manner, for example by diazotising in a mineral acid solution, for example a hydrochloric-acid-containing solution, with a nitrite, for example sodium nitrite, at a low temperature, for example from 0 to 30° C., and then coupling with the appropriate coupling component in a neutral to slightly acidic medium, for example at a pH from 3 to 7 and at low temperatures, for example from 0 to 30° C. As the diazo compound for the preparation of the monoazo compound of formula (5) there come into consideration, for example, 4-(β-sulfatoethylsulfonyl)-aniline-2-sulfonic and 4-(β-sulfatoethylsulfonyl)aniline.

Monoazo compounds of the formula (4) are disclosed in, for example, U.S. Pat. No. 5,395,925 and can be prepared in analogy to the method described therein.

Monoazo compounds of the formula (5) are disclosed in, for example, U.S. Pat. No. 5,747,657 and can be prepared in analogy to the method described therein.

Because the process steps indicated above can be carried out in different orders, in some cases also simultaneously, different process variants are possible. The reaction is generally carried out step-wise, the order of the simple reactions between the individual reaction components advantageously being governed by the particular conditions. In a preferred embodiment:

(i) a compound of the formula (4) is condensed with cyanuric halide of the formula (6) to the resulting product of formula

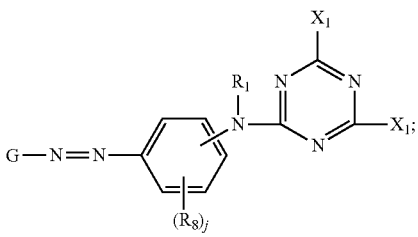
(9a)

(ii) a compound of the formula (5) is condensed with cyanuric halide of the formula (7) to the resulting product of formula (9b)

(iii) a diamine of the formula (8) is condensed with one of the compounds of the formulae (9a) and (9b) obtained according to (i) and (ii), whereupon the compound of the formula

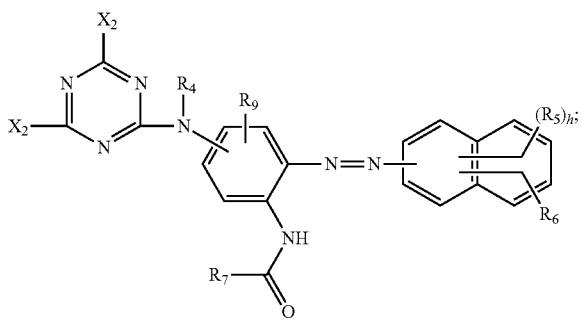
(10a)

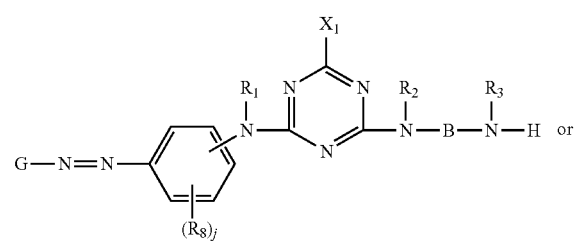
(10b)

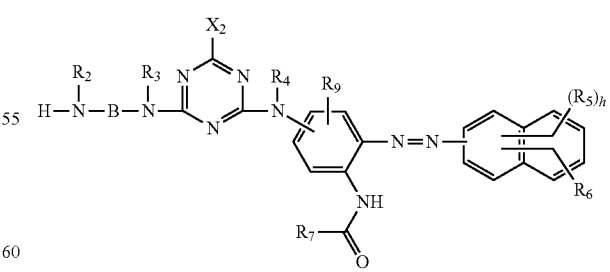

is obtained; and (iv) the compound of the formula (10a) or (10b) obtained according to (iii) is condensed with, in each case, the other compound of the formula (9a) and (9b) obtained according to (i) and (ii); wherein B, G, $R_1$, $R_2$, $R_3$, $R_4$, $R_5$, $R_6$, $R_7$, $R_8$, $R_9$, $X_1$, $X_2$, h and j each independently having the respective definitions and preferred meanings given above.

The condensation reactions between the compounds of the formulae (4) and (6), and (5) and (7), the condensation reaction between the compound of the formula (9a) or (9b) with the diamine of the formula (8), and the condensation reaction between the compound of the formula (10a) or (10b) with the other compound of the formula (9a) or (9b) are generally carried out analogously to known methods, usually in aqueous solution at temperatures of, for example, from −2° C. to 50° C. and at a pH of, for example, from 5 to 10. Condensation reactions with cyanuric fluoride or with the condensation products of formulae (9a) and (9b), wherein $X_1$ and $X_2$ are fluorine, are generally carried out at temperatures of, for example, from −2° C. to 35° C.

The condensation reactions according to steps (i) and (ii) above are generally carried out at temperatures of, for example, from −2° C. to 20° C. and at a pH of, for example, from 5 to 7. The condensation reaction according to steps (iii) and (iv) above are generally carried out at temperatures of, for example, from 0° C. to 50° C. and at a pH of, for example, from 6 to 10.

In the condensation reactions described above approximately 1 molar equivalent of each of the compounds of the formulae (4), (5), (6), (7) and (8) are reacted with one another. Suitably, the compounds of formulae (6) and (7) are applied equimolar or in a slight excess, for example, 1.0 to 1.5 molar equivalents of the compound of the formula (6) is condensed with 1 molar equivalent of the compound of the formula (4) and 1.0 to 1.5 molar equivalents of the compound of the formula (7) is condensed with 1 molar equivalent of the compound of the formula (5). Approximately 1 molar equivalent of each of the compounds of the formulae (8), (9a) or (9b) and (10a) or (10b) are applied in the condensation reaction between the compound of the formula (9a) or (9b) with the diamine of the formula (8) according to (iii) above, and the condensation reaction between the compound of the formula (10a) or (10b) with the other compound of the formula (9a) or (9b) according to (iv) above).

In another embodiment the separate steps (i) and (ii) of the procedure described above are carried together in one first step, by condensing, for example, approximately 1 molar equivalent of each of the compounds of the formulae (4) and (5) with approximately 2 molar equivalents, for example, 2 to 3 molar equivalents of cyanuric halide of the formula (6) (or of the formula (7)) in accordance with the conditions described above, whereupon a mixture of compounds of the formulae

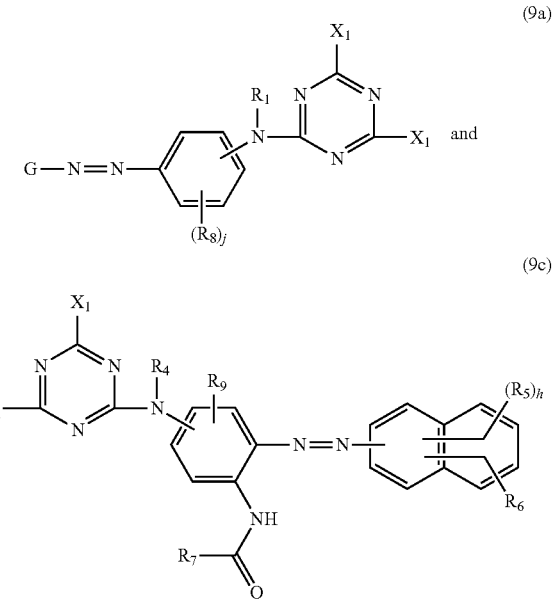

is obtained; and on further reaction in a second step approximately 1 molar equivalent of the compound of the formula (8) is added to the reaction mixture obtained in the first step and the condensation reaction is completed, whereupon a mixture of compounds of the formulae

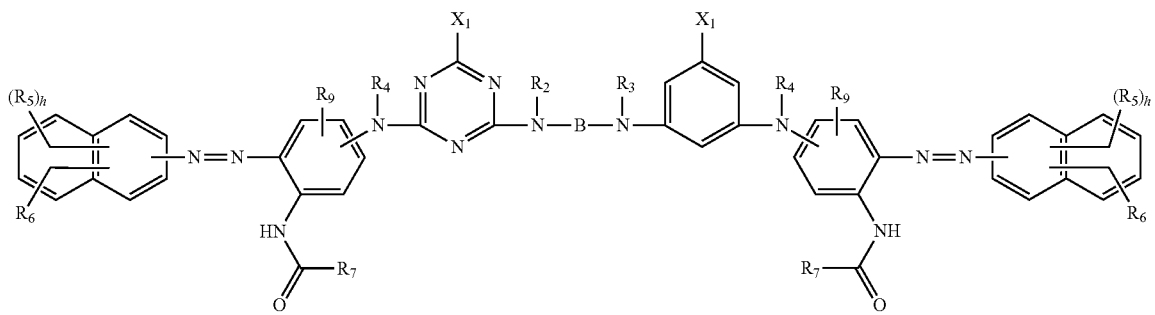

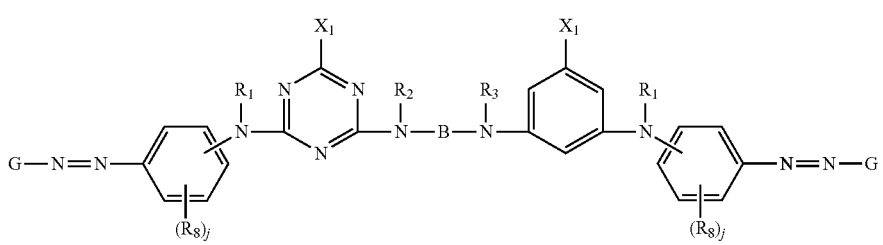

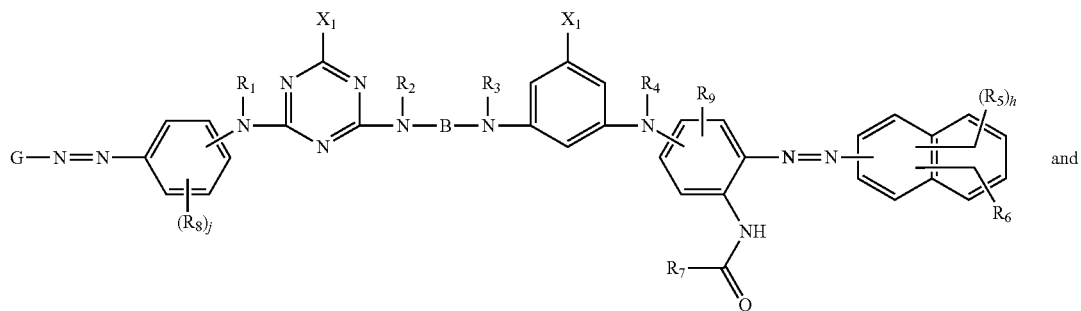

(11c)

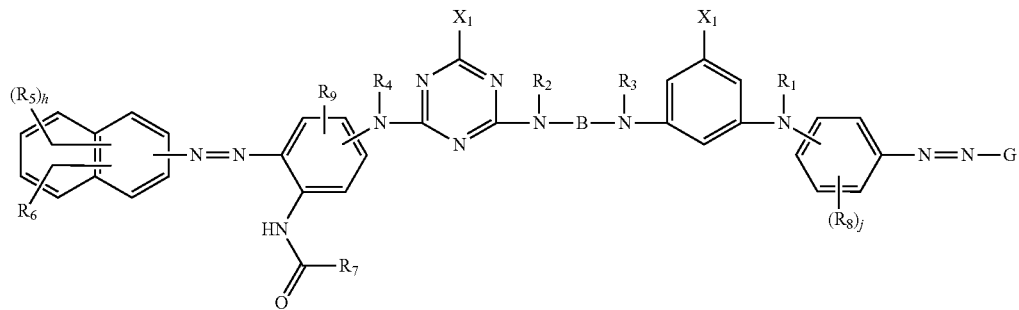

(11d)

is obtained.

The present invention accordingly relates also to reactive dye mixtures comprising at least one dye of formulae (11a) and (11b) together with at least one dye of the formulae (11c) and (11d), especially one dye of each of the formulae (11a), (11b), (11c) and (11d), wherein the definitions and preferred meanings given above for each of B, G, $R_1$, $R_2$, $R_3$, $R_4$, $R_5$, $R_6$, $R_7$, $R_8$, $R_9$, $X_1$, h and j apply.

If appropriate, the end product can also be subjected to a conversion reaction. Such a conversion reaction is, for example, the conversion of a vinylatable reactive group contained in $Z_1$ or $Z_2$ into its vinyl form by treatment with dilute sodium hydroxide solution, for example the conversion of the β-sulfatoethylsulfonyl or β-chloroethylsulfonyl group into the vinylsulfonyl radical or the conversion of the α,β-dihalopropionylamino group into the α-haloacryloylamino radical. Such reactions are known per se. The conversion reaction is generally carried out in neutral to alkaline medium at a temperature of, for example, from 20 to 70° C., at a pH value of, for example, from 6 to 14.

The dyes and the dye mixtures according to the present invention are fibre-reactive. Fibre-reactive dyes are to be understood as being those which are capable of reacting with the hydroxyl groups of cellulose, with the amino, carboxy, hydroxy or thiol groups in wool and silk or with the amino and possibly carboxy groups of synthetic polyamides to form covalent chemical bonds.

The dyes and the dye mixtures according to the invention are suitable for dyeing and printing an extremely wide variety of materials, such as hydroxyl-group-containing or nitrogen-containing fibre materials. Examples are silk, leather, wool, polyamide fibres and polyurethanes and also especially cellulosic fibre materials of all kinds. Such cellulosic fibre materials are, for example, the natural cellulosic fibres, such as cotton, linen and hemp, and also cellulose and regenerated cellulose. The dyes and the dye mixtures according to the invention are also suitable for dyeing or printing hydroxyl-group-containing fibres present in blend fabrics, e.g. mixtures of cotton with polyester fibres or polyamide fibres. The dyes and the dye mixtures according to the invention are especially suitable for dyeing or printing cellulosic, especially cotton-containing, fibre materials. They may also be used for dyeing or printing natural or synthetic polyamide fibre materials.

The dyes and the dye mixtures according to the invention can be applied to the fibre material and fixed to the fibre in a variety of ways, especially in the form of aqueous dye solutions and dye print pastes. They are suitable both for the exhaust process and for dyeing in accordance with the pad-dyeing process, according to which the goods are impregnated with aqueous, optionally salt-containing, dye solutions and the dyes are fixed, after treatment with an alkali or in the presence of an alkali, optionally under the action of heat or as a result of being kept at room temperature for several hours. After fixing, the dyeings or prints are thoroughly rinsed with cold and hot water, optionally with addition of an agent that has a dispersing action and promotes diffusion of unfixed dye.

The dyes and the dye mixtures according to the invention are distinguished by high reactivity, good fixing capacity and very good build-up capacity. They can therefore be used in the exhaust dyeing process at low dyeing temperatures and require only short steaming times in the pad-steam process. The degrees of fixing are high and unfixed dye can be washed off readily, the difference between the degree of exhaust and the degree of fixing being remarkably small, that is to say the soaping loss is very small. The dyes and the dye mixtures according to the invention are also especially suitable for printing, more especially on cotton, and also for printing nitrogen-containing fibres, for example wool or silk or blend fabrics that contain wool or silk.

The dyeings and prints produced using the dyes according to the invention have a high tinctorial strength and a high fibre-dye binding stability in both the acidic and the alkaline range, as well as good fastness to light and very good wet-fastness properties, such as fastness to washing, to water, to seawater, to cross-dyeing and to perspiration, and also good fastness to pleating, to hot pressing and to rubbing.

The present invention relates also to aqueous inks comprising a reactive dye of formula (1), the respective definitions and preferred meanings given above applying for B, G, $R_1$, $R_2$, $R_3$, $R_4$, $R_5$, $R_6$, $R_7$, $R_8$, $R_9$, $X_1$, $X_2$, h and j.

The dyes used in the inks should preferably have a low salt content, that is to say they should have a total content of salts of less than 0.5% by weight, based on the weight of the dyes. Dyes that have relatively high salt contents as a result of their preparation and/or as a result of the subsequent addition of diluents can be desalted, for example, by membrane separation procedures, such as ultrafiltration, reverse osmosis or dialysis.

The inks preferably have a total content of dyes of from 1 to 35% by weight, especially from 1 to 30% by weight and preferably from 1 to 20% by weight, based on the total weight of the ink. As a lower limit, a limit of 1.5% by weight, preferably 2% by weight and especially 3% by weight, is preferred.

The inks may comprise water-miscible organic solvents, for example $C_1$-$C_4$alcohols, such as methanol, ethanol, n-propanol, isopropanol, n-butanol, sec-butanol, tert-butanol and iso-butanol; amides, e.g. dimethylformamide and dimethylacetamide; ketones or ketone alcohols, e.g. acetone and diacetone alcohol; ethers, e.g. tetrahydrofuran and dioxane; nitrogen-containing heterocyclic compounds, e.g. N-methyl-2-pyrrolidone and 1,3-dimethyl-2-imidazolidone; polyalkylene glycols, e.g. polyethylene glycol and polypropylene glycol; $C_2$-$C_6$-alkylene glycols and thioglycols, e.g. ethylene glycol, propylene glycol, butylene glycol, triethylene glycol, thiodiglycol, hexylene glycol and diethylene glycol; further polyols, e.g. glycerol and 1,2,6-hexanetriol; and $C_1$-$C_4$alkyl ethers of polyhydric alcohols, e.g. 2-methoxy-ethanol, 2-(2-methoxyethoxy)ethanol, 2-(2-ethoxyethoxy)ethanol, 2-[2-(2-methoxyethoxy)-ethoxy]ethanol and 2-[2-(2-ethoxyethoxy)ethoxy]ethanol; preferably N-methyl-2-pyrrolidone, diethylene glycol, glycerol or especially 1,2-propylene glycol, usually in an amount of from 2 to 30% by weight, especially from 5 to 30% by weight and preferably from 10 to 25% by weight, based on the total weight of the ink.

The inks may also comprise solubilisers, e.g. $\epsilon$-caprolactam.

The inks may comprise thickeners of natural or synthetic origin inter alia for the purpose of adjusting the viscosity.

Examples of thickeners that may be mentioned include commercially available alginate thickeners, starch ethers or locust bean flour ethers, especially sodium alginate on its own or in admixture with modified cellulose, e.g. methylcellulose, ethylcellulose, carboxymethyl-cellulose, hydroxyethylcellulose, methyl hydroxyethylcellulose, hydroxypropyl cellulose or hydroxypropyl methylcellulose, especially with preferably from 20 to 25% by weight carboxy-methylcellulose. Synthetic thickeners that may be mentioned are, for example, those based on poly(meth)acrylic acids or poly(meth)acrylamides.

The inks comprise such thickeners, for example, in an amount of from 0.01 to 2% by weight, especially from 0.01 to 1% by weight and preferably from 0.01 to 0.5% by weight, based on the total weight of the ink.

The inks may also comprise buffer substances, e.g. borax, borates, phosphates, poly-phosphates or citrates. Examples that may be mentioned include borax, sodium borate, sodium tetraborate, sodium dihydrogen phosphate, disodium hydrogen phosphate, sodium tripolyphosphate, sodium pentapolyphosphate and sodium citrate. They are used especially in amounts of from 0.1 to 3% by weight, preferably from 0.1 to 1% by weight, based on the total weight of the ink, in order to establish a pH value of, for example, from 4 to 9, especially from 5 to 8.5.

As further additives, the inks may comprise surfactants or humectants.

Suitable surfactants include commercially available anionic or non-ionic surfactants. As humectants in the inks according to the invention there come into consideration, for example, urea or a mixture of sodium lactate (advantageously in the form of a 50% to 60% aqueous solution) and glycerol and/or propylene glycol in amounts of preferably from 0.1 to 30% by weight, especially from 2 to 30% by weight.

Preference is given to inks having a viscosity of from 1 to 40 mPa·s, especially from 1 to 20 mPa·s and preferably from 1 to 10 mPa·s.

The inks may also comprise customary additives, such as antifoam agents or especially substances that inhibit the growth of fungi and/or bacteria. Such additives are usually used in amounts of from 0.01 to 1% by weight, based on the total weight of the ink.

The inks can be prepared in customary manner by mixing together the individual constituents in the desired amount of water.

The inks according to the invention are especially suitable for use in recording systems of a kind wherein an ink is expressed from a small opening in the form of droplets that are directed towards a substrate on which an image is produced. Suitable substrates are, for example, paper, textile fibre materials or plastics films. Suitable recording systems are, for example, commercially available inkjet printers for use in paper or textile printing, or writing instruments, such as fountain pens or ballpoint pens and especially inkjet printers.

Depending on the nature of its use, it may be necessary for e.g. the viscosity or other physical properties of the ink, especially those properties affecting the affinity for the substrate in question, to be modified as appropriate.

As examples of paper that can be printed with the inks according to the invention there may be mentioned commercially available inkjet paper, photo paper, glossy paper, plastics-coated paper, e.g. Epson inkjet paper, Epson photo paper, Epson glossy paper, Epson glossy film, HP special inkjet paper, Encad photo gloss paper and Ilford photo paper. Plastics films that can be printed with the inks according to the invention are, for example, transparent or cloudy/opaque. Suitable plastics films are, for example, 3M transparency film.

As textile fibre materials there come into consideration, for example, nitrogen-containing or hydroxy-group-containing fibre materials, for example textile fibre materials of cellulose, silk, wool or synthetic polyamides, preferably cellulose.

The present invention accordingly relates also to a method of printing textile fibre materials, paper or plastics films, preferably textile fibre materials or paper and especially textile fibre materials, by the inkjet printing method, wherein an aqueous ink comprising a reactive dye of formula (1) is used, the respective definitions and preferred meanings given above applying for B, G, $R_1$, $R_2$, $R_3$, $R_4$, $R_5$, $R_6$, $R_7$, $R_8$, $R_9$, $X_1$, $X_2$, h and j.

In the inkjet printing method, individual droplets of the ink are sprayed onto a substrate in a controlled manner from a nozzle. For this purpose, predominantly the continuous inkjet method and the drop-on-demand method are used. In the continuous inkjet method, the droplets are produced continuously and any droplets not required for the printing are conveyed to a collecting vessel and recycled, whereas in the drop-on-demand method droplets are produced and printed as required; that is to say droplets are produced only when required for the printing. The production of the droplets can be effected, for example, by means of a piezo-inkjet head or by means of thermal energy (bubble jet). Preference is given to printing by means of a piezo-inkjet head for the method according to the invention. In addition, preference is given to printing in accordance with the continuous inkjet method for the method according to the invention.

The recordings, e.g. prints, which are produced are distinguished especially by a high degree of colour strength and of colour brilliance and also by good light- and wet-fastness properties.

The following Examples serve to illustrate the invention. Unless otherwise indicated, the temperatures are given in degrees Celsius, parts are parts by weight and percentages relate to % by weight. Parts by weight relate to parts by volume in a ratio of kilograms to litres.

Example 1

(a) 10.0 mmol of monoazo compound #1 whch in its free acid form corresponds to the formula

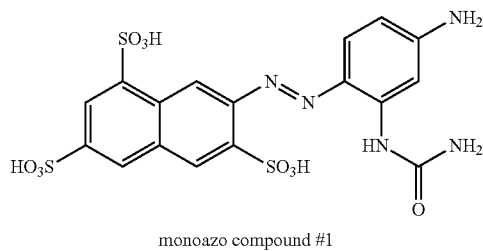 [SMILES: NC(=O)Nc1cc(N)ccc1/N=N/c1cc2c(S(=O)(=O)O)cc(S(=O)(=O)O)cc2cc1S(=O)(=O)O]

monoazo compound #1 and 0.025 g of sodiumtripolyphoshate are dissolved in 250 ml of water at 0° C. and pH 7 by adding carefully an aqueous sodium hydroxide solution (30%). The mixture obtained is cooled to −2° C. by addition of 50 g of ice and, subsequently, 13.0 mmol of cyanuric fluoride are slowly added at this temperature under vigorous stirring. During the addition the temperature is maintained at 0° C. and the pH is maintained at a range of from 6 to 7 using an aqueous sodium hydroxide solution. The first condensation step is completed by agitating the reaction mixture at pH 6 for further 30 minutes at a temperature of from 0 to 2° C. The reaction mixture obtained contains as its main component a primary condensation product which in its free acid form corresponds to the formula

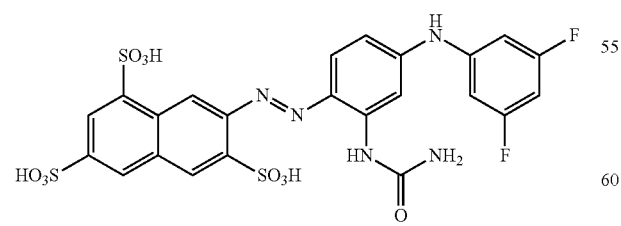

(b) To the reaction mixture obtained in accordance with step (a) a neutral aqueous solution of 10.3 mmol 1,2-propylenediamine is added dropwise. During the addition the temperature is maintained at 0° C. and the pH is maintained at 6.5 by means of an aqueous sodium hydroxide solution (30%). After the addition is complete the temperature of the reaction mixture is allowed to raise to 20° C. and the reaction is completed by further agitation for another hour at pH 6.5 and 20° C. The reaction mixture obtained contains as its main component a product which in its free acid form corresponds to the formula

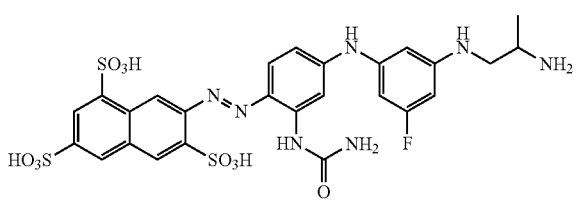 [SMILES: CC(N)CNc1cc(F)cc(Nc2ccc(/N=N/c3cc4c(S(=O)(=O)O)cc(S(=O)(=O)O)cc4cc3S(=O)(=O)O)c(NC(N)=O)c2)c1]

(c) To the reaction mixture obtained in accordance with step (b) 15.0 mmol of the primary condensation product which in its free acid form corresponds to the formula

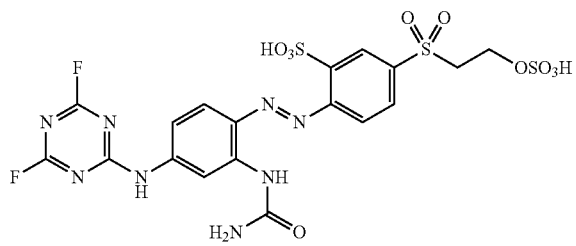

are added at a temperature of from 30 to 35° C. while maintaining the pH in a range of from 7.0 to 7.5. The primary condensation product is obtained by conversion of monoazo compound #2 which in its free acid form corresponds to the formula

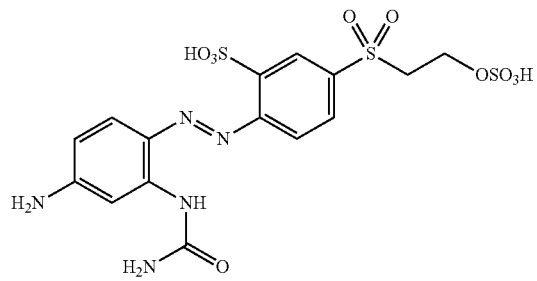

monoazo compound #2 with cyanuric fluoride in analogy to step (a) as described above. After completion of the condensation reaction vinylation of the β-sulfatoethyl group is carried out by increasing the pH of the reaction mixture to 11 with a sodium hydroxide solution (30%) and agitation for 15 minutes at a temperature of from 30 to 35° C. Subsequently, the pH of the reaction mixture is adjusted to 7.5 by careful addition of hydrochloric acid (32%). The obtained mixture is desalted for two hours by using a dialysis membrane and then lyophilisated. 21.4 g of a crude dye product are obtained which main component, in the form of the free acid, corresponds to the formula

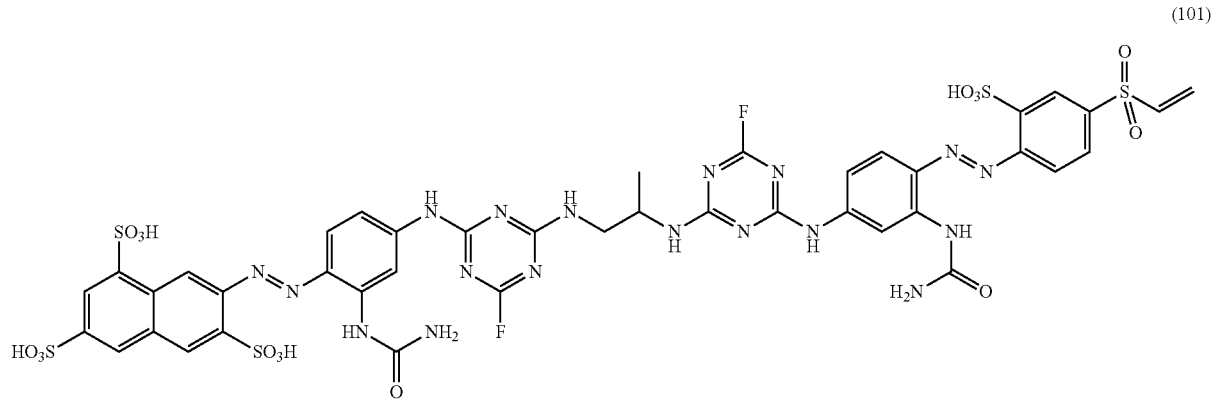 [SMILES: C=CS(=O)(=O)c1ccc(/N=N/c2ccc(Nc3nc(F)nc(NC(C)CNc4nc(F)nc(Nc5ccc(/N=N/c6cc7c(S(=O)(=O)O)cc(S(=O)(=O)O)cc7cc6S(=O)(=O)O)c(NC(N)=O)c5)n4)n3)cc2NC(N)=O)c(S(=O)(=O)O)c1]

(101)

($\lambda_{max}$: 419 nm). The dye product dyes cotton in a golden-yellow shade having a high degree of fixation and good all-round fastness properties, in particular washing-fastness.

Example 2

A product which main component, in the form of the free acid, corresponds to the formula

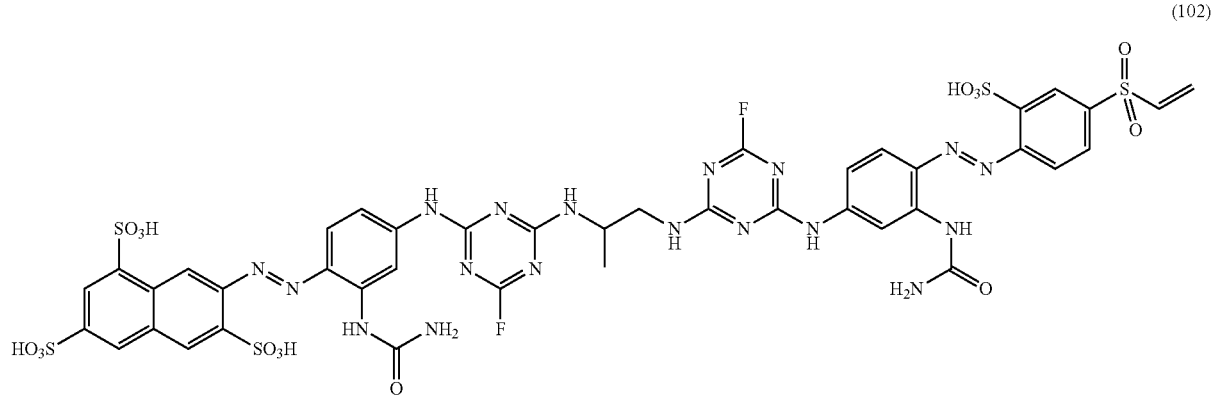 [SMILES: C=CS(=O)(=O)c1ccc(/N=N/c2ccc(Nc3nc(F)nc(NCC(C)Nc4nc(F)nc(Nc5ccc(/N=N/c6cc7c(S(=O)(=O)O)cc(S(=O)(=O)O)cc7cc6S(=O)(=O)O)c(NC(N)=O)c5)n4)n3)cc2NC(N)=O)c(S(=O)(=O)O)c1]

(102)

($\lambda_{max}$: 419 nm) can be obtained by repeating the procedure described in Example 1 above, but using instead of the monoazo compound #1 in step (a) the monoazo compound #2 and using in step (c) instead of the primary condensation product of cyanuric fluoride and the monoazo compound #2 the primary condensation product of cyanuric fluoride and the monoazo compound #1. The dye product dyes cotton in a golden-yellow shade having a high degree of fixation and good all-round fastness properties, in particular washing-fastness.

Examples 3-7

The following dyes, each of which dyes cellulose in a golden-yellow shade with good all-round fastness properties, can be prepared in a manner analogous to that described in Example 1.

3

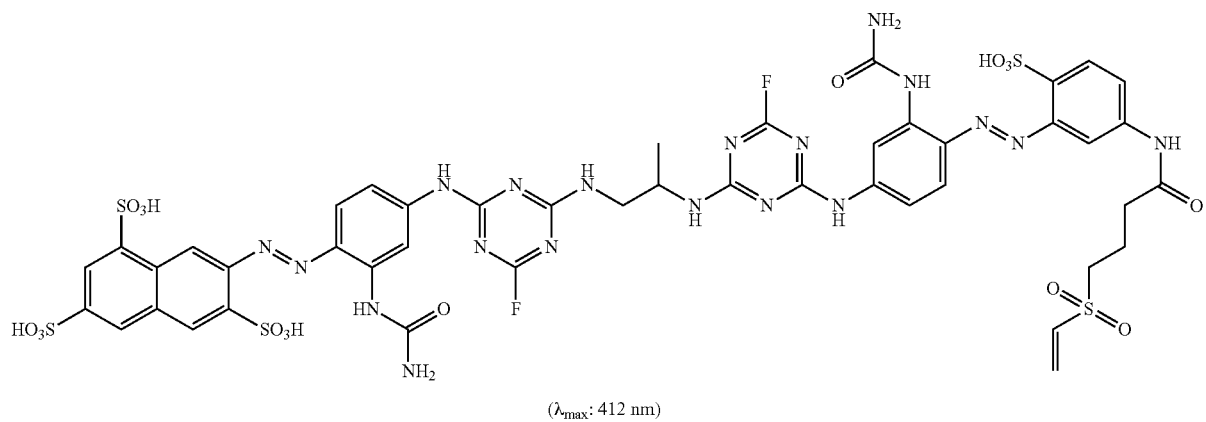

($\lambda_{max}$: 412 nm)

4

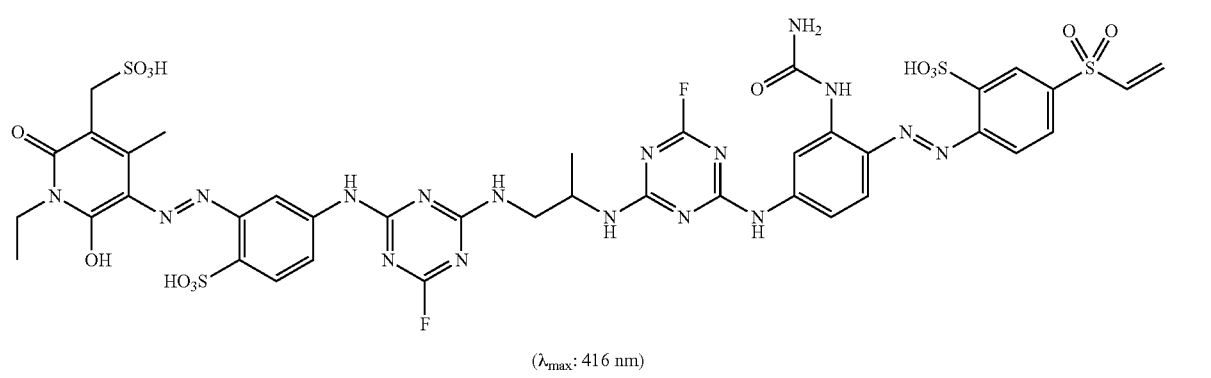

($\lambda_{max}$: 416 nm)

5

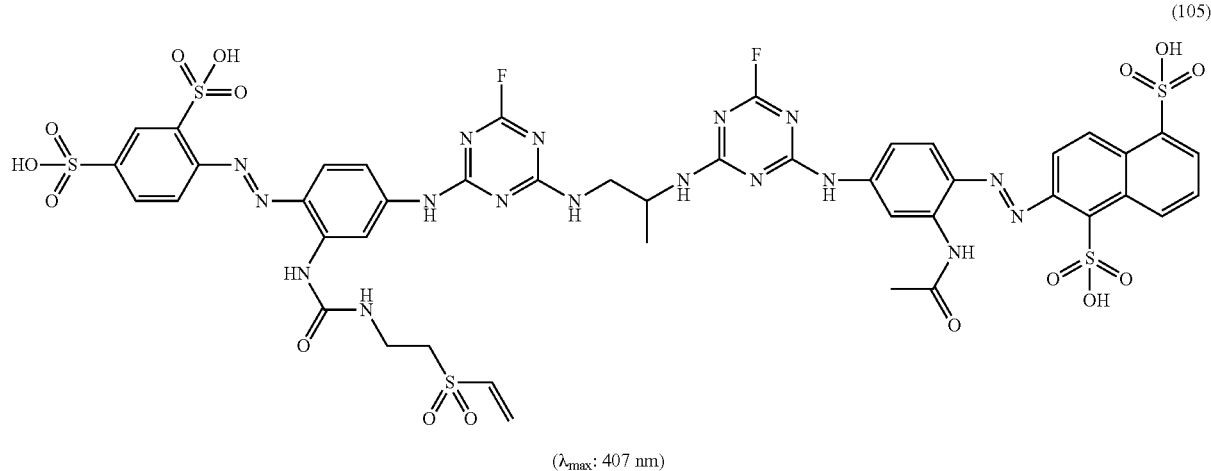

($\lambda_{max}$: 407 nm)

-continued

6

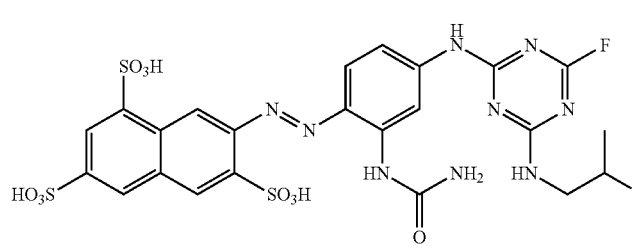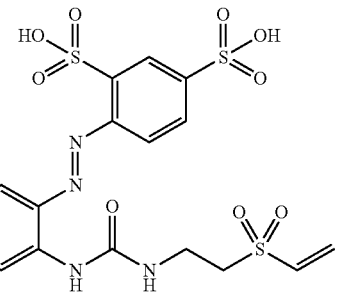

(106)

($\lambda_{max}$: 422 nm)

7

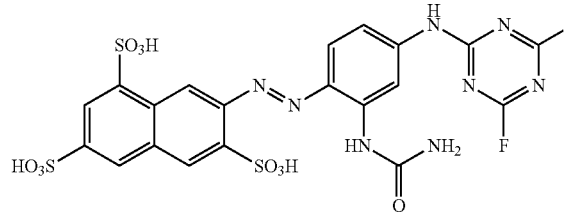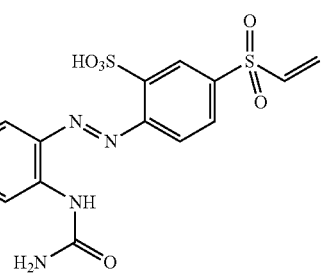

(107)

($\lambda_{max}$: 419 nm)

The dyes dye cotton in a golden-yellow shade having a high degree of fixation and good all-round fastness properties, in particular washing-fastness.

Example 8

(a) 10.0 mmol of monoazo compound #1 and 10.0 mmol of monoazo compound #2 which in their free acid form correspond to the formula given above are dissolved in 500 ml of water at 0° C. and pH 7.5 by adding carefully aqueous sodium hydroxide solution (30%). 1.0 g of sodium tripolyphoshate and 100 g of ice are added to the mixture obtained and the mixture is allowed to cool to −2° C. 30.0 mmol of cyanuric fluoride are slowly added at this temperature under vigorous stirring. During the addition the pH is maintained at 6 by means of aqueous sodium hydroxide solution. The first condensation step is completed by agitating the reaction mixture for further 30 minutes at a temperature of from 0 to 2° C.

(b) To the reaction mixture obtained in accordance with step (a) a neutral aqueous solution of 10.0 mmol 1,2-propylenediamine is added dropwise. During the addition the temperature is maintained at 0° C. and the pH is maintained at 9.0 by means of an aqueous sodium hydroxide solution (30%). After the addition is complete the temperature of the reaction mixture is allowed to raise to 20° C. and the reaction is completed by further agitation for another hour at pH 9.0 and 20° C. Vinylation of the β-sulfatoethyl group is carried out by increasing the pH of the reaction mixture to 11 with a sodium hydroxide solution (30%) and agitation for 15 minutes at a temperature of from 30 to 35° C. Subsequently the pH of the reaction mixture is adjusted to 7.5 by careful addition of hydrochloric acid (32%). The obtained mixture is desalted for two hours by using a dialysis membrane and then lyophilisated. 20.0 g of a crude dye product are obtained which, in the form of the free acid, corresponds to a mixture of the compounds of the formulae (101), (102),

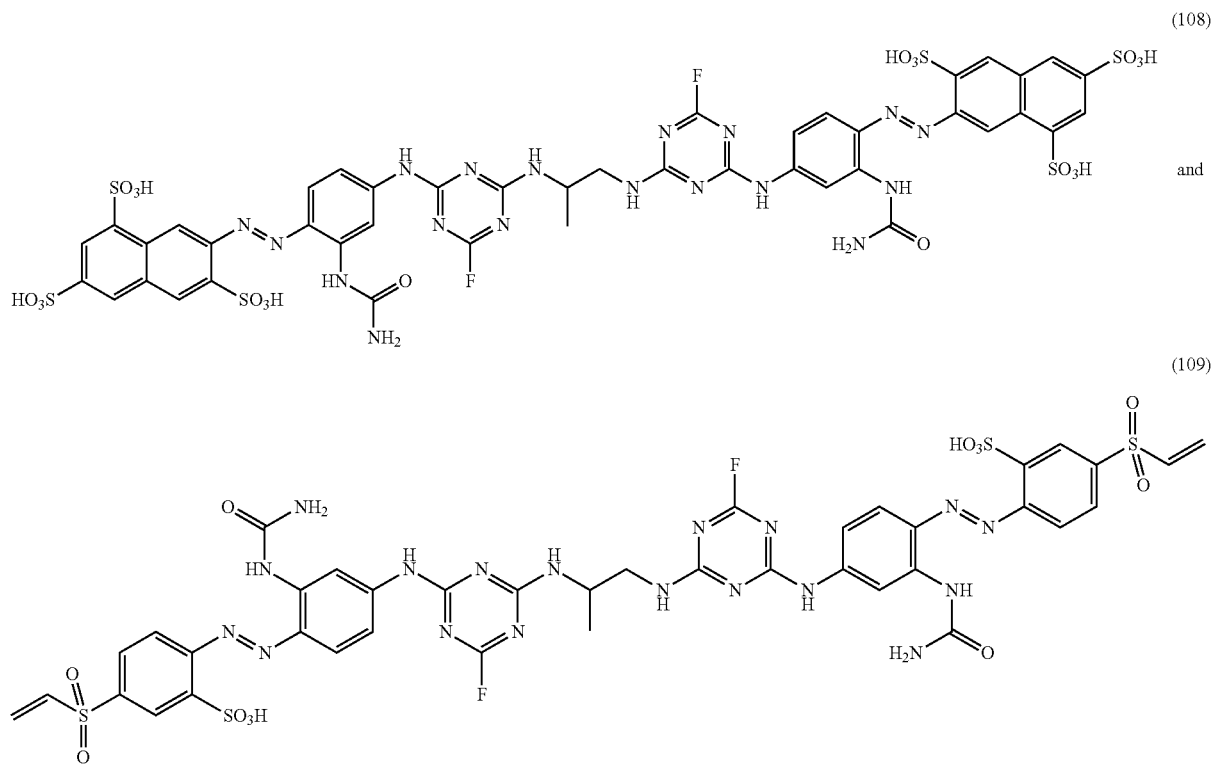

($\lambda_{max}$: 419 nm). The dye mixture dyes cotton in a golden-yellow shade having a high degree of fixation and good all-round fastness properties, in particular washing-fastness.

Exhaust dyeing: A cotton tricot fabric is introduced at 60° C. into an aqueous dyebath with a liquor ratio of 1:10 which contains the amount of the dyestuff prepared according to Example 1 and sodium chloride as indicated in Table 1.

TABLE 1

Composition of dyebaths 1 to 6 containing the dyestuff of Example 1

| dyebath | 1 | 2 | 3 | 4 | 5 | 6 |
|---|---|---|---|---|---|---|
| %* of dyestuff | 0.5 | 1.0 | 2.0 | 4.0 | 6.0 | 8.0 |
| sodium chloride [g/l] | 40 | 50 | 60 | 90 | 100 | 100 |
| sodium carbonate [g/l] | 10 | 12 | 14 | 18 | 18 | 18 |

*% of dyestuff is with respect to the weight of the cotton fabric

After 45 minutes at 60° C. calcined sodium carbonate is added in the amount given in Table 1. Dyeing is continued for 45 minutes. The dyed goods are then rinsed with water, soaped and rinsed again and then dried.

The tinctorial strengths of the dyeings obtained with the dyeing liquors 1 to 6 are measured photospectrometrically. Table 2 shows build-up properties of the dyestuff prepared according to Example 1. The dyestuff shows very good build-up properties.

TABLE 2

Build-up: dependence of reference depth (RD) from dyestuff concentration

| % of dyestuff | 0 | 0.5 | 1.0 | 2.0 | 4.0 | 6.0 | 8.0 |
|---|---|---|---|---|---|---|---|
| RD dyestuff of Ex 1 | 0 | 0.51 | 1.01 | 1.74 | 2.53 | 2.53 | 2.65 |

Dyeing Procedure I 100 parts of cotton fabric are introduced at 60° C. into 1500 parts of a dye bath containing 45 g/l of sodium chloride and 2 parts of the reactive dye obtained according to Example 1. After 45 minutes at 60° C., 20 g/l of anhydrous sodium carbonate are added. Dyeing is continued for a further 45 minutes at that temperature. The dyed goods are then rinsed, soaped at the boil for a quarter of an hour with a non-ionic detergent, rinsed again and dried.

As an alternative to the above procedure, the dyeing can be carried out at 80° C. instead of at 60° C.

Dyeing Procedure II 0.1 part of the dye according to Example 1 is dissolved in 200 parts of water, and 0.5 part of sodium sulfate, 0.1 part of a levelling adjuvant (based on the condensation product of a higher aliphatic amine and ethylene oxide) and also 0.5 part of sodium acetate are added. The pH is then adjusted to a value of 5.5 using acetic acid (80%). The dye bath is heated at 50° C. for 10 minutes and then 10 parts of a woollen fabric are added. Heating is then carried out, over the course of approximately 50 minutes, to a temperature of 100° C. and dyeing is carried out at that temperature for 60 minutes, after which the dye bath is allowed to cool to 90° C. and the dyed goods are removed. The woollen fabric is washed with hot and cold water, and is then spun and dried.

Printing Procedure I 3 parts of the dye obtained according to Example 1 are sprinkled, with rapid stirring, into 100 parts of a stock thickener containing 50 parts of 5% sodium alginate thickener, 27.8 parts of water, 20 parts of urea, 1 part of sodium m-nitrobenzenesulfonate and 1.2 parts of sodium hydrogen carbonate. The print paste so obtained is used to print a cotton fabric, and the resulting printed material is dried and steamed in saturated steam for 2 minutes at 102° C. The printed fabric is then rinsed, if desired soaped at the boil and rinsed again, and subsequently dried.

Printing Procedure II
(a) Mercerised cotton-satin is padded using a liquor containing 30 g/l of sodium carbonate and 50 g/l of urea (liquor uptake 70%) and dried.
(b) The cotton-satin pre-treated according to Step (a) is printed using an aqueous ink containing
15% by weight of the reactive dye of formula (101) according to Example 1
15% by weight of 1,2-propylene glycol and
70% by weight of water
using a drop-on-demand inkjet head (bubble jet). The print is dried completely and fixed in saturated steam at 102° C. for 8 minutes, cold-rinsed, washed off at the boil, rinsed again and dried.

What is claimed is:

1. A reactive dye of the formula (1b)

wherein
B is a radical of the formula —$CH_2$—$CH(R_{12})$— or —$(R_{12})CH$—$CH_2$— wherein $R_{12}$ is $C_1$-$C_4$ alkyl,
$R_5$ is hydrogen or sulfo,
$Z_1$ is a fibre-reactive group of the formula —$SO_2$—Y (3a) or —NH—CO—$(CH_2)_1$—$SO_2$—Y (3b), $R_7$ is amino,
$R_8$ is ureido,
$X_1$ and $X_2$, are each independently of the other fluorine or chlorine,
k is a number 2 or 3, and
Y is vinyl or β-sulfatoethyl.

2. A reactive dye according to claim 1 wherein one of the radicals $X_1$ and $X_2$ is fluorine and the other one of the radicals $X_1$ and $X_2$ is chlorine.

3. A reactive dye according to claim 1 wherein $X_1$ and $X_2$ are fluorine.

4. A process for the preparation of a reactive dye according to claim 1 comprising reacting the compound (6)

in a first reaction and reacting the compound (7)

with in a second reaction and further reacting a compound of the formula $H_2N$—B—$NH_2$ (8)

with the reaction mixture obtained in either the first reaction or second reaction wherein B, $R_5$, $Z_1$, $R_7$, $R_8$, $X_1$, $X_2$, and k are as defined in claim 1.

5. An aqueous ink comprising a reactive dye of formula (1) according to claim 1.

6. A method of printing textile fibre materials, paper or plastics films which comprises spraying an aqueous ink according to claim 5 in the form of individual droplets onto the fibre material, paper or plastic film in a controlled manner from a nozzle.

7. A method of dyeing or printing a hydroxyl-group containing or nitrogen-group containing fibre material comprising applying the reactive dye of claim 1 to the fibre material.

8. The method according to claim 7, wherein the fibre material is a cellulosic fibre material.

* * * * *